(12) United States Patent
Peng et al.

(10) Patent No.: US 9,646,606 B2
(45) Date of Patent: May 9, 2017

(54) SPEECH RECOGNITION USING DOMAIN KNOWLEDGE

(71) Applicant: Google Inc., Mountain View, CA (US)

(72) Inventors: Fuchun Peng, Cupertino, CA (US); Ben Shahshahani, Menlo Park, CA (US); Howard Scott Roy, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 47 days.

(21) Appl. No.: 14/048,199

(22) Filed: Oct. 8, 2013

(65) Prior Publication Data

US 2015/0012271 A1 Jan. 8, 2015

Related U.S. Application Data

(60) Provisional application No. 61/843,710, filed on Jul. 8, 2013, provisional application No. 61/842,550, filed on Jul. 3, 2013.

(51) Int. Cl.
*G10L 15/00* (2013.01)
*G10L 15/08* (2006.01)
*G10L 15/18* (2013.01)
*G10L 15/22* (2006.01)
*G10L 15/183* (2013.01)

(52) U.S. Cl.
CPC .............. *G10L 15/08* (2013.01); *G10L 15/00* (2013.01); *G10L 15/18* (2013.01); *G10L 15/183* (2013.01); *G10L 15/1815* (2013.01); *G10L 15/22* (2013.01)

(58) Field of Classification Search
CPC ......... G10L 15/00; G10L 15/08; G10L 15/18; G10L 15/1815; G10L 15/183; G10L 15/22; G10L 2015/22
USPC .......................... 704/246, 251, 257, 270, 275
See application file for complete search history.

(56) References Cited

U.S. PATENT DOCUMENTS

| 5,027,406 A | 6/1991 | Roberts et al. |
| 5,712,957 A | 1/1998 | Waibel et al. |
| 5,797,123 A | 8/1998 | Chou et al. |
| 5,895,466 A | 4/1999 | Goldberg et al. |

(Continued)

FOREIGN PATENT DOCUMENTS

| EP | 1 300 828 | 4/2003 |
| JP | 2000-076040 | 3/2000 |

(Continued)

OTHER PUBLICATIONS

"Correlation Coefficient," http://mathbits.com/MathBits/TISection/Statistics2/correlation.htm, accessed Jul. 8, 2013, 3 pages.

(Continued)

*Primary Examiner* — Pierre-Louis Desir
*Assistant Examiner* — Forrest F Tzeng
(74) *Attorney, Agent, or Firm* — Fish & Richardson P.C.

(57) ABSTRACT

In some implementations, data that indicates multiple candidate transcriptions for an utterance is received. For each of the candidate transcriptions, data relating to use of the candidate transcription as a search query is received, a score that is based on the received data is provided to a trained classifier, and a classifier output for the candidate transcription is received. One or more of the candidate transcriptions may be selected based on the classifier outputs.

21 Claims, 5 Drawing Sheets

(56) References Cited

U.S. PATENT DOCUMENTS

| | | | |
|---|---|---|---|
| 6,021,384 A | 2/2000 | Goren et al. | |
| 6,064,959 A | 5/2000 | Young et al. | |
| 6,453,292 B2 | 9/2002 | Ramaswamy et al. | |
| 6,513,006 B2 | 1/2003 | Howard et al. | |
| 6,556,970 B1 | 4/2003 | Sasaki et al. | |
| 6,587,824 B1 | 7/2003 | Everhart et al. | |
| 6,615,172 B1* | 9/2003 | Bennett | G06F 17/2775 704/257 |
| 6,629,066 B1 | 9/2003 | Jackson et al. | |
| 6,633,235 B1 | 10/2003 | Hsu et al. | |
| 6,643,620 B1 | 11/2003 | Contolini et al. | |
| 6,795,808 B1 | 9/2004 | Strubbe et al. | |
| 6,839,668 B2 | 1/2005 | Kuo et al. | |
| 6,839,669 B1 | 1/2005 | Gould et al. | |
| 6,879,956 B1* | 4/2005 | Honda | G10L 15/075 704/244 |
| 6,993,482 B2 | 1/2006 | Ahlenius | |
| 7,020,609 B2 | 3/2006 | Thrift et al. | |
| 7,315,818 B2 | 1/2008 | Stevens et al. | |
| 7,450,698 B2 | 11/2008 | Bushey et al. | |
| 7,457,751 B2 | 11/2008 | Shostak | |
| 7,555,431 B2 | 6/2009 | Bennett | |
| 7,567,907 B2 | 7/2009 | Greene et al. | |
| 7,599,838 B2 | 10/2009 | Gong et al. | |
| 7,603,360 B2 | 10/2009 | Ramer et al. | |
| 7,693,720 B2 | 4/2010 | Kennewick et al. | |
| 7,729,920 B2 | 6/2010 | Char | |
| 7,788,248 B2 | 8/2010 | Forstall et al. | |
| 7,840,579 B2 | 11/2010 | Samuelson et al. | |
| 7,917,368 B2 | 3/2011 | Weinberg | |
| 7,949,529 B2 | 5/2011 | Weider et al. | |
| 8,027,974 B2 | 9/2011 | Gibbs | |
| 8,065,148 B2 | 11/2011 | Huerta et al. | |
| 8,069,041 B2 | 11/2011 | Kuboyama et al. | |
| 8,126,839 B2 | 2/2012 | Chen et al. | |
| 8,156,109 B2 | 4/2012 | Kamvar et al. | |
| 8,175,887 B2 | 5/2012 | Shostak | |
| 8,239,206 B1 | 8/2012 | LeBeau et al. | |
| 8,244,544 B1 | 8/2012 | LeBeau et al. | |
| 8,260,809 B2 | 9/2012 | Platt et al. | |
| 8,271,107 B2 | 9/2012 | Bodin et al. | |
| 8,296,383 B2 | 10/2012 | Lindahl | |
| 8,315,870 B2 | 11/2012 | Hanazawa | |
| 8,326,328 B2 | 12/2012 | LeBeau et al. | |
| 8,352,266 B2 | 1/2013 | Farmaner et al. | |
| 8,364,481 B2 | 1/2013 | Strope et al. | |
| 8,626,511 B2 | 1/2014 | LeBeau et al. | |
| 8,694,303 B2* | 4/2014 | Hopkins | G06F 17/2818 704/2 |
| 2001/0041980 A1 | 11/2001 | Howard et al. | |
| 2002/0049805 A1 | 4/2002 | Yamada et al. | |
| 2002/0128843 A1 | 9/2002 | Firman | |
| 2002/0198714 A1 | 12/2002 | Zhou | |
| 2003/0093419 A1 | 5/2003 | Bangalore et al. | |
| 2003/0149564 A1 | 8/2003 | Gong et al. | |
| 2003/0149566 A1 | 8/2003 | Levin et al. | |
| 2004/0193420 A1 | 9/2004 | Kennewick et al. | |
| 2004/0199375 A1 | 10/2004 | Ehsani et al. | |
| 2005/0004799 A1 | 1/2005 | Lyudovyk | |
| 2005/0004889 A1 | 1/2005 | Bailey et al. | |
| 2005/0021826 A1 | 1/2005 | Kumar | |
| 2005/0038781 A1 | 2/2005 | Ferrari et al. | |
| 2005/0182628 A1* | 8/2005 | Choi | G10L 15/08 704/252 |
| 2005/0283364 A1 | 12/2005 | Longe et al. | |
| 2006/0035632 A1 | 2/2006 | Sorvari et al. | |
| 2006/0106614 A1 | 5/2006 | Mowatt et al. | |
| 2006/0129387 A1 | 6/2006 | Mitchell et al. | |
| 2006/0143007 A1 | 6/2006 | Koh et al. | |
| 2007/0050352 A1 | 3/2007 | Kim | |
| 2007/0208567 A1 | 9/2007 | Amento et al. | |
| 2007/0219798 A1 | 9/2007 | Wang et al. | |
| 2008/0065617 A1 | 3/2008 | Burke et al. | |
| 2008/0177547 A1 | 7/2008 | Yaman et al. | |
| 2008/0183699 A1* | 7/2008 | Hu | G06F 17/30864 |
| 2008/0221903 A1 | 9/2008 | Kanevsky et al. | |
| 2009/0030684 A1 | 1/2009 | Cerra et al. | |
| 2009/0030696 A1 | 1/2009 | Cerra | |
| 2009/0094030 A1 | 4/2009 | White | |
| 2009/0144609 A1 | 6/2009 | Liang et al. | |
| 2009/0177461 A1 | 7/2009 | Ehsani | |
| 2009/0204410 A1 | 8/2009 | Mozer et al. | |
| 2009/0240488 A1 | 9/2009 | White et al. | |
| 2009/0248415 A1 | 10/2009 | Jablokov et al. | |
| 2009/0306989 A1 | 12/2009 | Kaji | |
| 2009/0326936 A1 | 12/2009 | Nagashima | |
| 2010/0042414 A1 | 2/2010 | Lewis et al. | |
| 2010/0169244 A1* | 7/2010 | Zeljkovic | G06F 17/3071 706/12 |
| 2010/0185446 A1 | 7/2010 | Homma et al. | |
| 2010/0185448 A1 | 7/2010 | Meisel | |
| 2010/0232595 A1 | 9/2010 | Bushey et al. | |
| 2011/0047120 A1 | 2/2011 | Kamvar et al. | |
| 2011/0087686 A1 | 4/2011 | Brewer et al. | |
| 2011/0131045 A1 | 6/2011 | Cristo et al. | |
| 2011/0153325 A1 | 6/2011 | Ballinger et al. | |
| 2011/0166851 A1 | 7/2011 | LeBeau et al. | |
| 2011/0166858 A1 | 7/2011 | Arun | |
| 2011/0184730 A1 | 7/2011 | LeBeau et al. | |
| 2011/0231191 A1 | 9/2011 | Miyazaki | |
| 2011/0246944 A1 | 10/2011 | Byrne et al. | |
| 2011/0289064 A1 | 11/2011 | LeBeau et al. | |
| 2011/0301955 A1 | 12/2011 | Byrne et al. | |
| 2012/0015674 A1 | 1/2012 | LeBeau et al. | |
| 2012/0023097 A1 | 1/2012 | LeBeau et al. | |
| 2012/0035932 A1 | 2/2012 | Jitkoff et al. | |
| 2012/0185252 A1 | 7/2012 | Wang et al. | |
| 2012/0245944 A1 | 9/2012 | Gruber et al. | |
| 2012/0253799 A1 | 10/2012 | Bangalore et al. | |
| 2012/0259636 A1 | 10/2012 | Sejnoha et al. | |
| 2012/0259801 A1 | 10/2012 | Ji et al. | |
| 2012/0271842 A1* | 10/2012 | Sun | G06F 17/3069 707/765 |
| 2012/0310645 A1 | 12/2012 | Gruenstein et al. | |
| 2013/0024195 A1* | 1/2013 | White | G06F 3/0236 704/235 |
| 2013/0041670 A1 | 2/2013 | Morgan et al. | |
| 2014/0136197 A1* | 5/2014 | Mamou | G10L 15/08 704/235 |

FOREIGN PATENT DOCUMENTS

| | | |
|---|---|---|
| JP | 2002-287793 | 10/2002 |
| JP | 2003-115929 | 4/2003 |

OTHER PUBLICATIONS

"Speech Recognition," Wikipedia, http://en.wikipedia.org/wiki/Speech_recognition, accessed May 29, 2013, 13 pages.

"Student's t-test," Wikipedia, https://en.wikipedia.org/wiki/Student's_t-test, accessed Jul. 8, 2013, 11 pages.

Chamiak, Eugene et al., "Coarse-to-fine n-best parsing and MaxEnt discriminative reranking," Proceedings of the 43rd Annual Meeting of the Association for Computational Linguistics (ACL) 2005, 8 pages.

Chang, Hung-An et al., "Recognizing English Queries in Mandarin Voice Search," in Proceedings of ICASSP, 2011, 4 pages.

Collins, Michael et al., "Discriminative Reranking for Natural Language Parsing," Computational Linguistics, vol. 31(1), 2005, 46 pages.

Collins, Michael et al., "Discriminative Syntactic Language Modeling for Speech Recognition," in Proceedings of ACL, 2005, 6 pages.

Della Pietra, Stephen et al., "Inducing Features of Random Fields," IEEE Transactions on Pattern Analysis and Machine Intelligence, vol. 19(4), 1997, 13 pages.

Dikici, Erinc et al., "Classification and Ranking Approaches to Discriminative Language Modeling for ASR," IEEE Transactions on Audio, Speech, and Language Processing, vol. 21(2), 2012, 10 pages.

(56) References Cited

OTHER PUBLICATIONS

Franz, Alex et al., "Searching the Web by Voice," in Proceedings 19th International Conference on Computational Linguistics (COLING), 2002, 5 pages.

Gao, Jianfeng et al., "An Empirical Study on Language Model Adaptation," ACM Trans on Asian Language Information Processing, 2006, 20 pages.

Jansen, Bernard J. et al., "Determining the User intent of web search engine queries," 16th International World Wide Web Conference (WWW 2007), 2007, 2 pages.

Jeong, Minwoo et al., "Speech Recognition Error Correction Using Maximum Entropy Language Model," in Proceedings of InterSpeech, 2004, 4 pages.

Jyothi, Preethi et al., "Large-scale Discriminative Language Model Reranking for Voice-search," in Proceedings of NAACL-HLT, 2012, 9 pages.

Kaufmann, Tobias et al., "Improving Broadcast News Transcription with a Precision Grammar and Discriminative Reranking," in Proceedings of ISCA, 2009, 4 pages.

Keshet, Joseph et al., "A Survey of Discriminative Language Modeling Approaches for Large Vocabulary Continuous Speech Recognition," Chapter 8 of Automatic Speech and Speaker Recognition: Large Margin and Kernel Methods, 2009, 21 pages.

Malouf, Robert "A Comparison of Algorithms for Maximum Entropy Parameter Estimation," in Proceedings of CONLL, 2002, 7 pages.

Mohri, Mehryar et al., "Weighted Finite-State Transducers in Speech Recognition," Computer Speech and Language, vol. 16(1), pp. 69-88, 2002, 26 pages.

Nigam, Kamal et al., "Using Maximum Entropy for Text Classification," in Proceedings of IJCAI Workshop on Machine Learning for Information Filtering, 1999, 7 pages.

Ratnaparkhi, Adwait "A Simple Introduction to Maximum Entropy Models for Natural Language Processing," Tech. Rep., Institute for Research in Cognitive Science, University of Pennsylvania, 1997, 13 pages.

Sak, Hasim et al., "Discriminative Reranking of ASR Hypotheses with Morpholexical and N-best-list Features," in Proceedings of ASRU, 2011, 6 pages.

Sak, Hasim et al., "On-the-fly Lattice Rescoring for Real-time Automatic Speech Recognition," in Proceedings of InterSpeech, 2010, 4 pages.

Schalkwyk, Johan et al., "Google Search by Voice: A case study," Advances in Speech Recognition: Mobile Environments, Call Centers and Clinics, 2010, 35 pages.

Yuan, Wei et al., "An Empirical Study on Language Model Adaptation Using a Metric of Domain Similarity," UCNLP 2006, LNAI 3651, 2005, 12 pages.

* cited by examiner

SPEECH RECOGNITION USING DOMAIN KNOWLEDGE

CROSS-REFERENCE TO RELATED APPLICATIONS

This application claims priority to U.S. Provisional Application No. 61/842,550, filed on Jul. 3, 2013, and U.S. Provisional Application No. 61/843,710, filed on Jul. 8, 2013. The entire contents of U.S. Provisional Patent Application Ser. No. 61/842,550 and U.S. Provisional Application No. 61/843,710 are incorporated herein by reference.

FIELD

This specification describes technologies related to speech recognition.

BACKGROUND

Automatic speech recognition is an important technology that is used in mobile devices and other devices. In general, automatic speech recognition attempts to provide accurate transcriptions of what a person has said.

SUMMARY

A speech recognition system can use information about one or more domains to re-score candidate transcriptions for an utterance. Re-scoring using domain information may indicate a correct candidate transcription better than output of a general speech recognizer. In some implementations, a speech recognition system can re-score candidate transcriptions using data related to use of the candidate transcriptions as queries. For example, the speech recognition system can receive content, such as search results, that a search service for a particular domain identifies as relevant to a candidate transcription. As another example, the speech recognition system can receive data indicating a frequency that the candidate transcription, or a portion of the candidate transcription, has been submitted as a query. The speech recognition system may provide a score based on the received data to a classifier that is trained to evaluate candidate transcriptions, to obtain an output from the classifier for the candidate transcription. In this manner, the speech recognition system may obtain classifier outputs for each of multiple candidate transcriptions for an utterance. The speech recognition system may then select from among the multiple candidate transcriptions based on the classifier outputs. For example, the candidate transcriptions may be ranked according to their classifier outputs and a highest-ranking candidate transcription may be selected.

In a general aspect, a method performed by data processing apparatus includes receiving data that indicates multiple candidate transcriptions for an utterance. The method includes, for each of the candidate transcriptions: receiving data relating to use of the candidate transcription as a search query; providing, to a trained classifier, a score that is based on the received data relating to use of the candidate transcription as a search query; and receiving, from the trained classifier, a classifier output that indicates a likelihood that the candidate transcription is a correct transcription. The method includes selecting from among the multiple candidate transcriptions based on the classifier outputs.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

Implementations may include one or more of the following features. For instance, receiving the data relating to use of the candidate transcription as a search query includes receiving data indicating a frequency of submission of the candidate transcription as a search query; and providing, to the trained classifier, the score that is based on the received data relating to use of the candidate transcription as a search query includes providing, as input to the trained classifier, a score that is indicative of the frequency of submission of the candidate transcription as a search query.

Implementations may include one or more of the following features. For instance, receiving the data relating to use of the candidate transcription as a search query includes receiving data indicating content that a search service identifies as relevant to the candidate transcription. The method may include determining a feature score based on the content that the search service identifies as relevant to the candidate transcription. Providing, to the trained classifier, the score that is based on the received data relating to use of the candidate transcription as a search query includes providing the feature score to a classifier that is trained to indicate a likelihood that a candidate transcription is correct based at least partially on a feature score for content identified by the search service.

Implementations may include one or more of the following features. For instance, receiving data indicating content that a search service identifies as relevant to the candidate transcription includes receiving data indicating first content that a search service for a first domain identifies as relevant to the candidate transcription. Determining the feature score based on the content includes determining a first feature score for a first feature based on the first content. The method may include, for each of the candidate transcriptions: receiving data indicating second content that a search service for a second domain identifies as relevant to the candidate transcription, the second content being different from the first content; determining a second feature score for a second feature based on the second content, the second feature being different from the first feature; and providing the second feature score to the trained classifier. Receiving, from the trained classifier, a classifier output for the candidate transcription includes receiving a classifier output based on the first feature score and the second feature score.

Implementations may include one or more of the following features. For instance, determining the feature score based on the content includes determining a feature score that indicates a degree that the content matches the candidate transcription. Determining the feature score that indicates the degree that the content matches the candidate transcription includes determining a feature score indicating a degree that a highest-ranked search result indicated by the content matches the candidate transcription. Determining the feature score that indicates the degree that the content matches the candidate transcription includes determining a feature score indicating a degree that a second-ranked search result indicated by the content matches the candidate transcription. Determining the feature score based on the content includes accessing a score that is generated by the search service. The method may include providing one or more of the multiple candidate transcriptions to a search service as a query. Selecting from among the multiple candidate transcriptions includes: ranking the multiple candidate transcriptions based on the classifier outputs; and selecting the highest-ranked candidate transcription. Providing the score to the trained classifier includes providing the score to a maximum entropy classifier. The trained classifier has been trained using (i) a first set of scores corresponding to first features relevant to a first domain and (ii) a second set of feature scores for second features relevant to a second domain, the second features being different from the first features.

The details of one or more embodiments of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
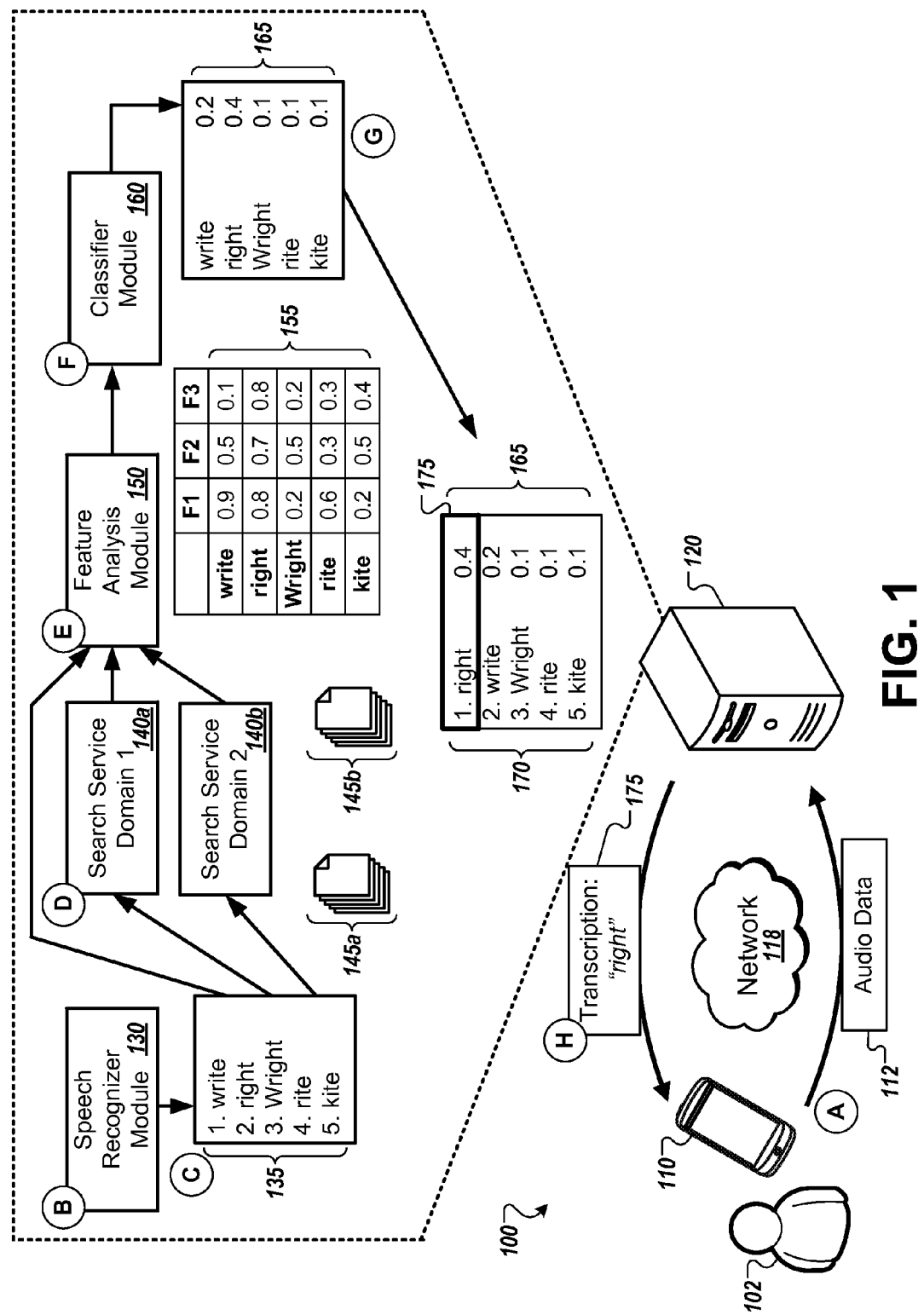
FIG. 1 is a block diagram that illustrates an example of a system for speech recognition using domain knowledge.

FIG. 1 is a block diagram that illustrates an example of a system 100 for speech recognition using domain knowledge. The system 100 includes a client device 110, a computing system 120, and a network 118. In the example, the computing system 120 receives audio data 112 from the client device 110, and the computing system 120 uses domain-specific information to provide a transcription 175 for the audio data 112. The figure shows stages (A) to (H) which illustrate a flow of data.

The client device 110 can be, for example, a desktop computer, a laptop computer, a cellular phone, a smart phone, a tablet computer, a music player, an e-book reader, or a navigation system. The functions performed by the computing system 120 can be performed by individual computer systems or can be distributed across multiple computer systems. The network 118 can be wired or wireless or a combination of both, and may include private networks and/or public networks, such as the Internet.

In some implementations, domains represent different uses for speech recognition output. For example, searching the World Wide Web (e.g., using a transcription as a query) may be considered to be one domain, and searching a media library may be considered a second domain. As additional examples, searching an application catalog may be considered a third domain, and providing a voice action (e.g., a voice command) may be considered a fourth domain. A domain may represent a one or more subject matter areas, such as music, movies, television, sports, and so on. In addition, or as an alternative, a domain may represent a particular type or collection of data to be searched, such as web pages for a web search, or an application catalog for a search of applications.

In some instances, a single, general speech recognizer may be used for speech recognition across multiple different domains. However, some speech recognizers may not be able to take advantage of information about the particular domains or contexts in which a transcription will be used. In some instances, the correct transcription for an utterance may be included in a set of candidate transcriptions that the speech recognizer provides, but the correct transcription may not be indicated as most likely to be correct. For example, rather than being indicated as the most likely transcription, the correct transcription may be assigned the second or third position in a ranking of candidate transcriptions provided by the speech recognizer.

For example, street names may occur infrequently in training data for a speech recognizer, causing the speech recognizer to consider street names as unlikely to be the best transcription in many instances. However, street names may be common in GPS navigation directions. When recognizing an utterance, knowing that a particular transcription represents a street name in a navigation domain may suggest that the particular transcription is more likely to be correct than the speech recognizer system has indicated. Accordingly, information about the domains or contexts in which recognized speech may be used can indicate whether a transcription is appropriate. For example, information about different domains may indicate whether a word or phrase is a plausible query for one or more of the different domains.

To improve speech recognition accuracy, information about one or more domains can be used to re-score and re-rank candidate transcriptions using domain information. For example, after a set of candidate transcriptions are identified for an utterance, further processing may be done for a set of the n-best candidate transcriptions, where n is an integer (e.g., the 3, 5, or 10 most likely transcriptions). Rather than accepting the transcription that the speech recognizer indicates is most likely, the set of n-best candidate transcriptions is re-ranked using domain information that was not accessible to the speech recognizer system.

For example, a language model that is broad enough to model naturally spoken queries may not be able to disambiguate between acoustically confusable sentences such as "I say" and "Ice Age." However, if it is known that the input is a query meant for an entertainment search service for finding information about TV shows, music, and movies, it appears more likely that "Ice Age," the title of a movie, is what the user meant.

Each of the n-best candidate transcriptions can be provided as a query to a search service (or to multiple different search services). Search results for each of the n-best candidate transcriptions are analyzed, for example, to determine how well each set of search results matches the corresponding query that produced the search results. Information about the quality of search results can indicate a degree that each candidate transcription is a plausible search query, which may indicate a likelihood that the candidate transcription is correct. If a candidate transcription does not produce meaningful search results, the candidate transcription is unlikely to be a correct transcription. On the other hand, if a candidate transcription produces high-quality search results (e.g., results that match the candidate transcription well), the candidate transcription is more likely to be correct. The information about the quality of the search results may be used to re-rank the n-best candidate transcriptions and select the transcription for an utterance.

In a similar manner, information about how often a candidate transcription is submitted as a query can indicate how plausible it is that a candidate transcription is a search query. For example, if the text of a candidate transcription is frequently submitted as a query in a particular domain (e.g., in a media search environment), the candidate transcription is more likely to be a correct transcription for a spoken query in that domain than other candidate transcriptions that are not submitted as queries as frequently in the domain. Information about query submission frequencies can also be used to re-rank the n-best candidate transcriptions, in addition to or instead of information about search results.

As discussed further below, information about search results from one or more domains can be provided to a trained classifier, along with feature information from the speech recognizer. The classifier, which has been trained using domain information, can indicate a likelihood score for each candidate transcription. The highest-ranking candidate transcriptions may be ranked according to the classifier outputs rather than likelihood scores provided by the speech recognizer that identified the candidate transcriptions. Because the classifier receives domain information that is not available to the speech recognizer system, the outputs of the classifier may indicate likelihoods that are more accurate than those provided by the speech recognizer.

In the example of FIG. 1, during stage (A), a user 102 speaks, and the client device 110 records the utterance of the user 102. For example, the user 102 may speak words that represent a query for searching, for example, the World Wide Web, a media library, an application store catalog, or another collection of data. The client device 110 transmits audio data 112 that includes the user's utterance to the computing system 120 over the network 118.

Figure 3A:
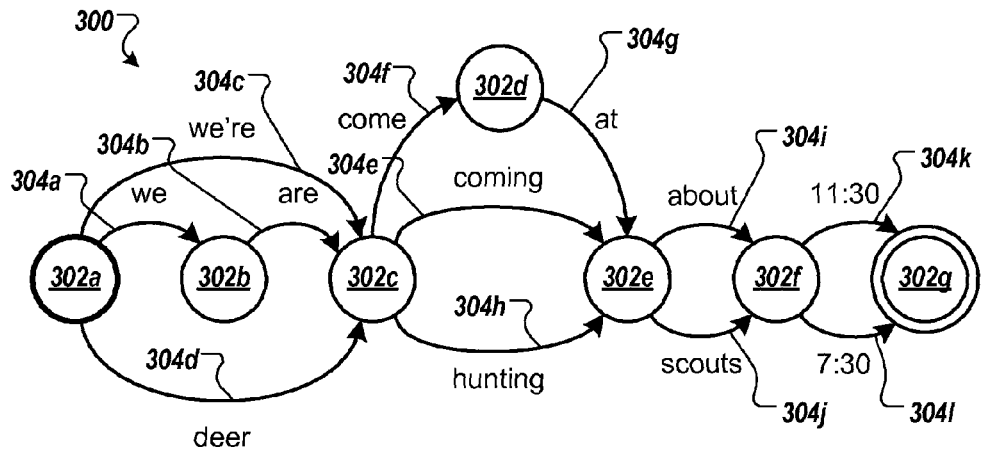
FIGS. 3A and 3B are diagrams that illustrate examples of word lattices.
Figure 3B:
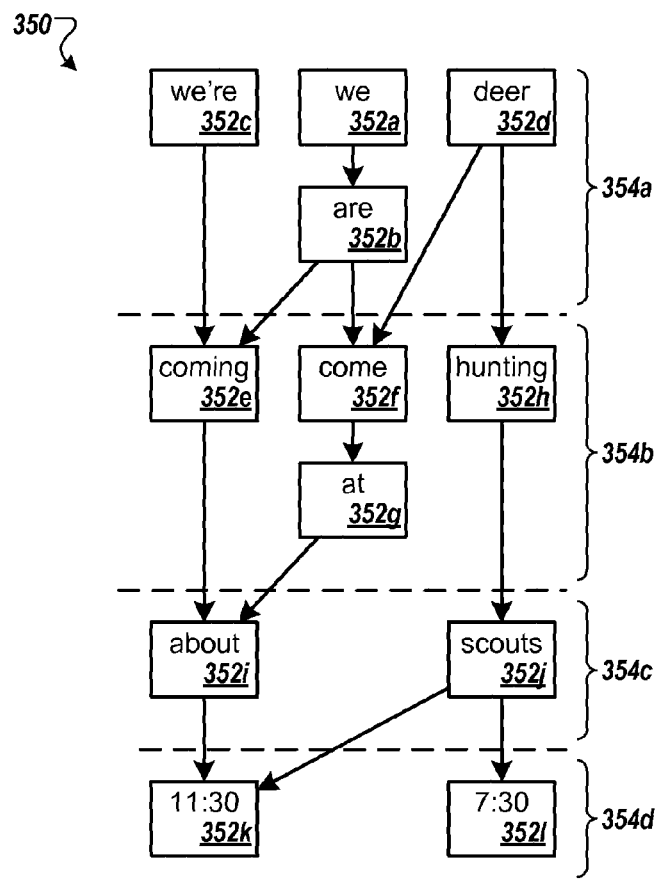

During stage (B), the computing system 120 receives the audio data 112 and obtains a set of candidate transcriptions. For example, the audio data 112 may be provided to a speech recognizer module 130 that may produces a word lattice indicating multiple different possible transcriptions for the utterance in the audio data 112. Examples of word lattices are shown in FIGS. 3A and 3B. The speech recognizer module 130 may use an acoustic model and language model to generate a word lattice or otherwise identify candidate transcriptions. The speech recognizer module 130 may also indicate which of the candidate transcriptions the speech recognizer module 130 considers most likely to be correct, for example, by providing likelihood scores and/or ranking for the candidate transcriptions.

During stage (C), the computing system 120 identifies a set of highest-ranking candidate transcriptions 135 from within the set of candidate transcriptions received. For example, using likelihood scores or ranking information from the speech recognizer module 130, the computing system 120 may select n candidate transcriptions with the highest likelihoods, where n is an integer. In the illustrated example, the top five candidate transcriptions (e.g., the five that are indicated as most likely to be correct) are selected as the set of highest-ranking candidate transcriptions 135.

During stage (D), the computing system 120 provides each of the candidate transcriptions 135 to at least one search service 140a, 140b. The candidate transcriptions may be provided to search services for multiple domains. In the example, each of the candidate transcriptions 135 is provided as a query to a first search service 140a for a first domain. Each of the candidate transcriptions 135 is also provided as a query to a second search service 140b for a second domain. The candidate transcriptions 135 are each provided as independent queries. For example, the transcription "write" is provided as a query to the search service 140a, and is also provided to the search service 140b, without information about the other candidate transcriptions 135. Similarly, the transcription "right" is provided individually to the search service 140a and the search service 140b, and so on.

Each of the search services 140a, 140b provides a set of search results for each of the candidate transcriptions 135. The first search service 140a provides search results 145a, which includes five different sets of search results, one set for each of the candidate transcriptions 135. The second search service 140b provides search results 145b, which also includes five different sets of search results, one set for each of the candidate transcriptions 135. Because the search services 140a, 140b correspond to different domains, the search results 145a from the first search service 140a may be different from the search results 145b from the second search service 140b. For example, a search service for a news domain and a search service for a shopping domain may both provide search results that identify web pages. However, when the same query is provided to the search services, each search service may indicate different sets of web pages in the search results.

The search services 140a, 140b may be implemented in any appropriate hardware, firmware, software, or combinations thereof. In some implementations, the search services 140a, 140b may include one or more server systems separate from the computing system 120. In other implementations, the computing system 120 and the search services 140a, 140b may be implemented together, for example, in a datacenter or a single computer system. In some implementations, the search services 140a, 140b are implemented as applications or services on the computing system 120 or another computer system.

In some implementations, search results 145a, 145b from different search service 140a, 140b may identify different types of documents or different types of information. For example, the search results from one domain may indicate web pages or other resources, and the search results from another domain may indicate artists, songs, and albums from a music library. Other domains may provide search results that are news headlines, shopping results, voice actions, or other types of results.

Figure 2A:
FIGS. 2A and 2B are diagrams that illustrate examples of search results.
Figure 2B:
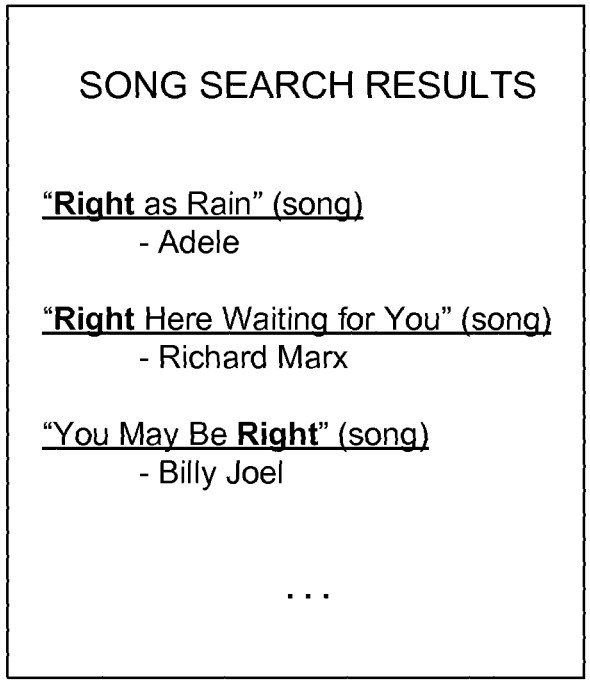

FIGS. 2A and 2B are diagrams that illustrate examples of search results. FIG. 2A illustrates a set of search results 200 received from the first search service 140a in response to the query "right." In the example, the first search service 140a is associated with a web search domain, so each of the results identifies a web page identified as relevant to the query. FIG. 2B illustrates a set of search results 250 received from the second search service 140b in response to the query "right." In the example, the second search service 140b is associated with a music library search domain, so each of the results indicates a song identified as relevant to the query. In the same manner that the search services 140a, 140b provide the sets of search results 200, 250 for the candidate transcription "right," the search services 140a, 140b also provide sets of search results for each of the other candidate transcriptions 135.

In some implementations, a search service for a domain may provide search results for each of multiple categories of information. For example, a media search domain may search within artist data (e.g., a list or database of artists known within the domain) and provide a first set of search results that are artist names. The media search domain may also search within album data and provide a second set of search results that are album names. Similarly, the media search domain may search within song data, movie data, television data, and application data to provide additional sets of search results that are, respectively, song titles, movie titles, television titles, and application names. In this manner, a domain may provide distinct sets of search results that identify the best matches to a query in each of multiple different categories of information.

Referring again to FIG. 1, during stage (E), the computing system 120 uses a feature analysis module 150 to determine feature scores 155 for one or more features of the search results 145a, 145b. The features may indicate different aspects or attributes of search results, or may indicate characteristics of different categories of search results. In addition to determining search result feature scores for the search results 145a, 145b, the feature analysis module 150 may also determine feature scores for speech recognition features and semantic features. In addition, or as an alternative, the feature analysis module 150 may determine other scores, such as query submission scores based on a frequency that a candidate transcription has been submitted as a query.

The feature scores 155 represent scores for search result features. One or more of the feature scores 155 may indicate a level of quality of search results 145a, 145b. In some implementations, a feature score 155 may indicate a confidence score, or quality score, a relevance score, an information retrieval score, or other measure that a search service provides. Feature scores may indicate how well the search results for a given candidate transcription 135 match the candidate transcription 135. The degree that a search result matches a candidate transcription may be based on, for example, whether the search result completely or partially matches the candidate transcription, whether words in the candidate transcription occur in the same sequence that the words occur in the candidate transcription, and/or a number of extra words in the search result or a number of words omitted from the search result relative to the candidate transcription. In some implementations, feature scores may indicate the number of search results returned for a query, and/or whether or not the top-ranked search result (e.g., the title of a document, media item, etc.) includes a complete string match for the candidate transcription.

In the example, the feature analysis module 150 provides feature scores 155 for each of three different features labeled F1, F2, and F3, but feature scores may be determined more or fewer features. A feature score 155 is determined for each of the features F1, F2, and F3 for each candidate transcription 135. The feature scores 155 for each candidate transcription 135 are determined using the sets of search results corresponding to that candidate transcription. For example, the sets of search results received in response to the query "write" are analyzed to determine the feature scores 155 for the candidate transcription "write"; the sets of search results received in response to the query "right" are analyzed to determine the feature scores 155 for the candidate transcription "right"; and so on. A feature score 155 may be determined based on an individual search result, such as the highest-ranked search result in a set. In some implementations, a feature score 155 may be based on multiple search results, for example, a feature score may indicate a total number of search results provided for a particular domain for a particular candidate transcription.

The features may include domain features corresponding to different domains. Because each domain may provide different types of search results, the characteristics of search results that relevant may be different for different domains. The feature scores for features associated with a particular domain are determined based on the search results received from the particular domain. For example, the features F1 and F2 may be features relevant to a first domain, and feature scores 155 for these features may be determined using the search results 145a from the first search service 140a. For the candidate transcription "right," domain scores for domain features relating to a web search domain may be determined based on the web search results 200 of FIG. 2A. The feature F3 may be a feature relevant to a second domain, and feature scores 155 for this feature may be determined using the search results 145b from the second search service 140b. For the same candidate transcription "right," domain scores for domain features relating to a music search domain may be determined based on the music search results 250 of FIG. 2B.

The features can be selected to indicate likelihoods that a candidate transcription represents a navigational query. A navigational query may be a query that represents a request for a single, specific result, such as a particular web page or a particular song or movie title. Features that represent characteristics of individual search results (e.g., the top-ranked search result, or the second-ranked search result, etc.) may be indicators of the degree that a candidate transcription corresponds to a specific result.

As an example, search results from a media catalog domain may indicate lists of which artists, albums, songs, movies, TV shows, and applications are considered most relevant to a candidate transcription. The domain features for the media catalog domain may represent characteristics of the highest-ranked search result within different media categories. For example, the domain features may include: (i) how well the best artist name search result matches the candidate transcription; (ii) how well the best album name search result matches the candidate transcription; (iii) how well the best song name search result matches the candidate transcription; (iv) how well the best movie title search result matches the candidate transcription; (v) how well the best TV show title search result matches the candidate transcription; and (vi) how well the best application name search result matches the candidate transcription. Additional domain features for the media catalog domain may represent the degree that the second-ranked search result (e.g., the second-highest ranked result) for each media category matches the corresponding candidate transcription.

As another example, a media viewing domain may indicate search results that indicate lists of movies, TV shows, or video clips. The domain features for the media catalog domain may represent the degree that the top-ranked search result for each of the media categories of movies, TV shows, or video clips matches the corresponding candidate transcription. Similarly, the domain features may additionally or alternatively include features that represent the degree that the second-ranked search result for each of the media categories matches the corresponding candidate transcription.

Typically, if a user has spoken, for example, a title of a movie, and the candidate transcription is correct, the highest-ranked movie result has a feature score indicating a high degree of match with the candidate transcription. The second-ranked movie result would tend to have a score indicating a lower degree of match, since the title is different from the title spoken by the user. By contrast, when feature scores indicate that the highest-ranked and second-ranked results are both poor matches for the candidate transcription, the candidate transcription may be unlikely to be correct.

In some implementations, feature scores 155 may be determined for other features or aspects of search results. For example, a category score can be determined. For a certain search service, it may be known, for example, that 50% of search results provided are movies, 30% of search results provided are TV shows, and 20% of search results are web videos. In this example, the likelihood that a search result is a movie could be estimated as 50%. The category score can indicate a likelihood that a search result provided by the search service is expected to be an item in the same category as the highest-ranked search result. For example, it may be determined that the highest-ranked search result is in the "movie" category, and the category score can be indicative of the likelihood that a movie, rather than another form of media, will be presented as a search result. As another example, a next category score (e.g., a category score for the next search result) can also be determined. The next category probability score can indicate a likelihood that an item in the same category as the second-highest-ranked search result will be provided as a search result. The category score and the next category score can indicate how different the highest-ranked result and the second-highest-ranked result are. The larger the difference between the likelihoods indicated by the two category scores, the more likely the candidate transcription represents a navigational query.

In addition to, or instead of determining feature scores for search results, the feature analysis module 150 may determine scores for speech recognition features and semantic features.

Speech recognition features can provide information from the speech recognizer module 130. For example, one speech recognition feature score may be a language model score, such as a score from an n-gram language model of the speech recognizer model 130. Another example is a rank position of a candidate transcription 135 in the first pass ranking from the speech recognizer N-best list. The highest-ranked candidate transcription 135, e.g., at "position 0," may be considered to be the best hypothesis from the speech recognizer module 130, and may be used as a baseline. Other examples of speech recognition feature scores include the number of tokens (e.g., words) in a candidate transcription 135, and a confidence score for a candidate transcription 135 from the speech recognizer module 130.

Semantic feature scores may be generated based on pattern matching. Many voice queries are commands like "show me movies by Jim Carey", or "open App". If a candidate transcription 135 matches a popular voice action pattern, it has a higher likelihood of being a correct recognition than a candidate transcription that does not match a known pattern. Each of the candidate transcriptions 135 may be parsed with a finite-state-machine-based pattern matching system, and semantic parsing feature scores may be created for popular voice actions, such as an "Open app" action, or a "Play media" action (e.g., play movies, music, TV show). Semantic features may be expressed in binary values. For example, if a candidate transcription matches a predetermined pattern, or any of multiple predetermined patterns, a semantic feature score of "1" may be provided, and otherwise a semantic feature score of "0" may be provided.

During stage (F), for each of the candidate transcriptions 135, the computing system 120 provides a feature vector to a classifier module 160 and receives a classifier output 165 from the classifier module 160. The feature vector can include feature scores 155 derived from the search results, as well as speech recognition feature scores and semantic feature scores. The classifier module 160 may be a classifier that has been trained to indicate a likelihood that a candidate transcription is correct based on, for example, the feature scores for search results corresponding to the candidate transcription. The classifier module 160 may be trained with, and may receive as input, sets of input data that include feature scores for the domain features for one or more domains. Through training, the classifier module 160 may learn to discriminate among different combinations of feature scores to be able to indicate which feature score values and combinations of feature score values suggest a transcription is likely to be correct and which feature score values and combinations do not.

The feature vector for a particular candidate transcription 135 can include the feature scores 155 determined from the search results 145a, 145b for the particular candidate transcription 135. For example, for the transcription "right," the feature vector may include the feature scores 155 of "0.8," "0.7" and "0.8," respectively, for the three domain features F1, F2, and F3 illustrated, which represent characteristics of the search results 200, 250. The feature vector may include feature scores 155 for each of multiple domains. For example, the feature vector may include feature scores for a media catalog domain, feature scores for a voice action domain, and feature scores for a web search domain. In this manner the classifier module 160 may be able to use information from multiple domains to provide better estimates of the likelihood of a transcription being correct. As a result, a classifier module 160 that receives feature scores for multiple domains may provide more accurate results than, for example, a domain-specific classifier that only receives feature scores for a single domain.

The feature vector may also include speech feature scores, which may indicate characteristics of the candidate transcription, word lattice, or other output of the speech recognizer module 130. For example, speech feature scores included in the feature vector may indicate one or more of, for example: (i) the position of the candidate transcription within the ranking provided by the speech recognizer module; (ii) a number of tokens (e.g., words) included in the candidate transcription; (iii) a language model score produced by a language model; and (iv) a speech confidence score, such as an overall confidence score generated by the speech recognizer module 130. Other information about a candidate transcription may additionally or alternatively be provided in a feature vector. In FIG. 1, the arrow from the candidate transcriptions 135 to the feature analysis module 150 indicates that information in the feature vector may include or be derived from output of the speech recognizer module 130.

The classifier module 160 can be a maximum entropy classifier. The classifier module 160 may use linear models to assess the feature vectors it receives. In addition, or as an alternative, the classifier module 160 may use decision trees or other models or machine learning techniques.

In some implementations, scores for candidate transcriptions are determined and provided to the classifier module 160 without requesting or obtaining search results for the candidate transcriptions. For example, the scores can include speech recognition feature scores based on output of the speech recognizer module 130, and/or the scores can include semantic feature scores based on the text of the candidate transcription. In addition, or as an alternative, the scores may include query submission scores that are indicative of how often a candidate transcription, or a portion of the candidate transcription, has been submitted as a search query. For example, query submission data can be used to determine how often users have submitted entered the text of the candidate transcription in a search query field and submitted the text as a search query. Query submission scores can be domain-specific, for example, with query submission scores for each of multiple different domains indicating how often the candidate transcription is submitted as a query in the different domains.

During stage (G), the computing system 120 receives classifier outputs 165 for the candidate transcriptions 135 and re-ranks the set of highest-ranking candidate transcriptions 135 according to the classifier outputs 165. The classifier module 160 may provide a classifier output 165 for each candidate transcription 135 (e.g., for each feature vector received) that indicates a likelihood that the candidate transcription 135 is correct.

In the illustrated example, the computing system 120 produces a new ranking 170 that is different from original ranking indicated by the speech recognizer module 130. In the new ranking 170, the positions of the transcriptions "write" and "right" have been switched to indicate that the transcription "right" is predicted as most likely to be correct. The computing system 120 selects the highest-ranked candidate transcription 175 from the new ranking 170 as the transcription for the audio data 112.

During stage (H), the computing system 120 provides the selected candidate transcription 175 to the client device 110 over the network 118. The client device 110 may then use the transcription in whatever manner the user 102 instructs, for example, by submitting the transcription 175 as search query, interpreting the transcription 175 as a voice action, or using the transcription in another manner.

In some implementations, the feature vector provided to the classifier module 160 includes feature scores from one or more three different feature categories: speech recognition features, semantic features, and search result features. Speech recognition features may include information produced by a language model for a given candidate transcription, such as a language model probability, a position within a ranking, a number of tokens, or a confidence score from the speech recognizer.

Semantic features may indicate information about of pattern matching analysis, for example, matching a candidate transcription to a grammar. For example, if a candidate transcription matches a popular voice action pattern, it has a better chance to be correct recognition. Many voice queries are commands, such as "show me movies by Jim Carey" or "open website." A candidate transcription may be parsed with a finite-state-machine-based pattern matching system to determine an extent that the candidate transcription matches different grammars for, for example, opening an application, playing a movie, requesting navigation directions, and so on. The feature score for each semantic feature may indicate a degree of match between the candidate transcription and a different grammar.

Search result features represent characteristics of search results. In particular, feature scores for a particular candidate transcription represent characteristics of the search results obtained when the particular candidate transcription is used as a query. The search result features may indicate a degree to which a candidate transcription is a navigational query in a particular category of search results. For example, various categories of search results from a domain may include TV shows, video clips, movie titles, application names, album names, and song titles. The various search result feature scores for this domain may respectively indicate, for example, how likely a candidate transcription is to be a particular TV show, how likely the candidate transcription is to be a movie title, and so on. This likelihood can be determined as a degree to which the candidate transcription matches the search result. For example, if the candidate transcription matches the top-ranked movie title in a set of search results, it is very likely that the candidate transcription is a navigational query specifying the movie title.

Feature scores may be determined for other search result features as well. For example, a feature score may indicate a number of search results returned for a given query. In general, a query that returns a large number of results is more likely to be a correct transcription than a query that returns fewer results. Another feature score may indicate whether the top search result has a complete string match to the candidate transcription/query that produced the result. Another feature score may indicate a degree to which a query is navigational, for example, as determined based on a distribution of user interactions with the search result. For example, if a large percentage of users click the top result in response to a query, the query may represent a navigational request.

Although the candidate transcriptions 135 illustrated in FIG. 1 are individual words, in some implementations, one or more of the transcriptions may be phrases including multiple words. For example, the audio data 112 may represent an entire query spoken by the user, and each of the transcriptions may be a candidate transcription for the audio data 112 as a whole.

The example of FIG. 1 shows processing using search results from two different domains and using the features of the two different domains. Candidate transcriptions may be evaluated using features of search results from more domains or fewer domains than illustrated. In some implementations, results are obtained for only a single domain, and the classifier receives only feature scores for a single domain. For example, the classifier may be a domain-specific classifier.

Although the search services 140a, 140b are illustrated as separate modules, in some implementations, the same search service may provide search results for different domains. A single search infrastructure may perform searches for different domains by, for example, searching using different parameters, searching different within data collections, or using other variations.

FIG. 3A is an example of a word lattice 300 that may be provided by a speech recognizer system. The word lattice 300 represents multiple possible combinations of words that may form different candidate transcriptions for an utterance.

The word lattice 300 includes one or more nodes 302a-g that correspond to the possible boundaries between words. The word lattice 300 includes multiple edges 304a-1 for the possible words in the transcription hypotheses that result from the word lattice 300. In addition, each of the edges 304a-1 can have one or more weights or probabilities of that edge being the correct edge from the corresponding node. The weights are determined by the speech recognizer module system and can be based on, for example, a confidence in the match between the speech data and the word for that edge and how well the word fits grammatically and/or lexically with other words in the word lattice 300.

For example, initially, the most probable path through the word lattice 300 may include the edges 304c, 304e, 304i, and 304k, which have the text "we're coming about 11:30." A second best path may include the edges 304d, 304h, 304j, and 304l, which have the text "deer hunting scouts 7:30."

Each pair of nodes may have one or more paths corresponding to the alternate words in the various candidate transcriptions. For example, the initial most probable path between the node pair beginning at the node 302a and ending at the node 302c is the edge 304c "we're". This path has alternate paths that include the edges 304a-b "we are" and the edge 304d "deer".

FIG. 3B is an example of a hierarchical word lattice 350 that may be provided by a speech recognizer system. The word lattice 350 includes nodes 352a-1 that represent the words that make up the various candidate transcriptions for an utterance. The edges between the nodes 352a-1 show that the possible candidate transcriptions include: (1) the nodes 352c, 352e, 352i, and 352k "we're coming about 11:30"; (2) the nodes 352a, 352b, 352e, 352i, and 352k "we are coming about 11:30"; (3) the nodes 352a, 352b, 352f, 352g, 352i, and 352k "we are come at about 11:30"; (4) the nodes 352d, 352f, 352g, 352i, and 352k "deer come at about 11:30"; (5) the nodes 352d, 352h, 352j, and 352k "deer hunting scouts 11:30"; and (6) the nodes 352d, 352h, 352j, and 352l "deer hunting scouts 7:30".

Again, the edges between the nodes 352a-1 may have associated weights or probabilities based on the confidence in the speech recognition and the grammatical/lexical analysis of the resulting text. In this example, "we're coming about 11:30" may currently be the best hypothesis and "deer hunting scouts 7:30" may be the next best hypothesis. One or more divisions 354a-d can be made in the word lattice 350 that group a word and its alternates together. For example, the division 354a includes the word "we're" and the alternates "we are" and "deer". The division 354b includes the word "coming" and the alternates "come at" and "hunting". The division 354c includes the word "about" and the alternate "scouts" and the division 354d includes the word "11:30" and the alternate "7:30".

Figure 4:
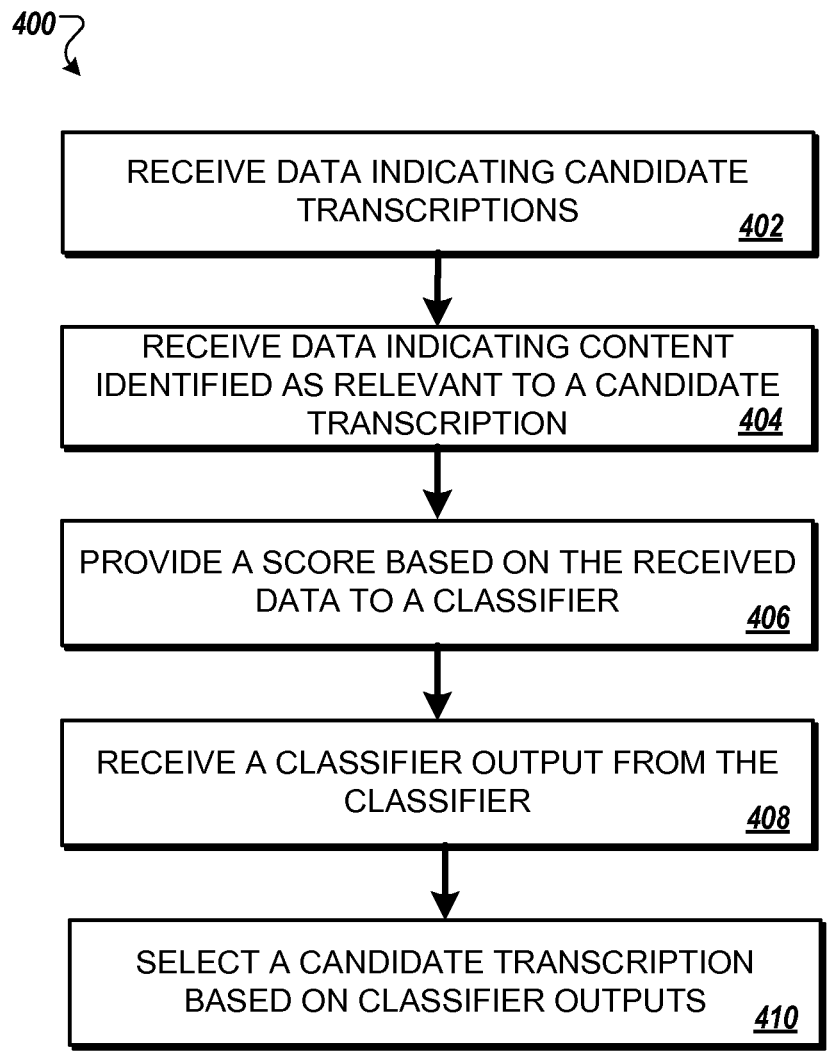
FIG. 4 is a flow diagram that illustrates an example of a process for speech recognition using domain knowledge.

FIG. 4 is a flow diagram that illustrates an example of a process 400 for speech recognition using domain knowledge. The operations of the process 400 may be performed by one or more computing systems, such as the computing system 120 of FIG. 1.

Data that indicates multiple candidate transcriptions for an utterance is received (402). For example, the data can include a word lattice that indicates multiple alternative translations for the utterance. The data can indicate likelihoods that the various candidate transcriptions are correct. A predefined number of candidate transcriptions, such as the n-best candidate transcriptions as indicated by the speech recognizer, may be identified and may be evaluated.

Data relating to use of a particular candidate transcription as a query is received (404). In some implementations, the data indicates content that a search service identifies as relevant to the candidate transcription. For example, the particular candidate transcription can be provided to a search service as a query, and search results for the particular candidate transcription may be received. The particular candidate transcription may be provided to search services for multiple different domains, and a set of search results may be received for each of the different domains.

In some implementations, the data relating to use of a particular candidate transcription as a query indicates a frequency that the particular candidate transcription, or a portion of the particular candidate transcription, has been submitted as a query. As an example, the frequency can indicate how often a query exactly matching the text of the candidate transcription is submitted. As another example, the frequency can indicate how often the candidate transcription occurs within submitted queries, even if the query includes additional text.

The data can indicate how often the candidate transcription was submitted with respect to a specific domain. In some implementations, the data indicates frequencies that the candidate transcription was submitted to search services for each of multiple different domains. For example, the data can indicate a first frequency of submission for a first domain, such as a web search domain, and the data can indicate a second frequency of submission for a second domain, such as a media search domain. Alternatively, the frequency can be a measure of query submissions that reflects submissions in multiple domains. A frequency can be expressed in a variety of different forms, including, for example, a number of submissions or other measure of query submissions, an measure of submissions within a particular time period (e.g., within the previous week, month, or year), and a relative rate of submission or measure of popularity relative to other queries.

A score based on the data relating to use of a particular candidate transcription as a query is provided to a classifier (406). The classifier may be a classifier that has been trained to indicate a likelihood that a candidate transcription is correct based at least partially on received scores. In some implementations, the classifier is a maximum entropy classifier.

In some implementations, the classifier is trained to indicate a likelihood that a candidate transcription is correct based on scores for semantic features, speech recognition features, search result features, and/or query submission frequencies. The classifier may be a classifier that has been trained using (i) a first set of scores corresponding to first features relevant to a first domain and (ii) a second set of scores for second features relevant to a second domain, where the second features are different from the first features.

In some implementations, when a search service identifies content relevant to the particular candidate transcription, a score is determined based on the content. The content may include a set of search results, and the score may be a value that indicates a characteristic of one or more of the search results. In some implementations, the score may a relevance score or other score that is generated by the search service. The score may indicate a degree that the content matches the candidate transcription. For example, the score may indicate a degree that a highest-ranked search result in a set of search results matches the candidate transcription. As another example, the score may indicate a degree that a second-highest-ranked search result in a set of search results matches the candidate transcription. In some domains, different features represent different types or categories of search results within the domain. For example, one feature may represent a characteristic of search results that are artist names, another feature may represent a characteristic of search results that are song titles, and so on.

The score may be provided to the classifier in a feature vector that includes scores for domain-specific features of different domains. For example, a first domain may be associated with a first set of features, and the feature scores for the first set of features may be determined based on search results from the first domain. A second domain may be associated with a second, different set of features, and the scores for the second set of features may be determined based on search results from the second domain. The feature vector may also include scores for speech features, for example: a position of the candidate transcription within the ranking provided by the speech recognizer module; a number of tokens (e.g., words) included in the candidate transcription; a language model score produced by a language model; and a speech recognizer confidence score. The feature vector may also include scores for semantic features.

In addition or as an alternative to scores based on search results, one or more query submission scores can be determined based on query submission data. For example, a score indicative of the frequency that the candidate transcription has been submitted as a query in a particular domain can be determined and input to the classifier. In some implementations, query submission scores indicative of submission frequencies in different domains can be determined and input to the classifier.

A classifier output for the candidate transcription is received from the classifier (408). The classifier output may be a score that indicates a likelihood that the candidate transcription is a correct transcription, in view of the scores associated with the candidate transcription and use of the candidate transcription as a query. The operations of (404)-(408) may be repeated for each of multiple candidate transcriptions for the utterance. For example, the operations may be repeated for each of the n-best candidate transcriptions to obtain a classifier output for each of the n-best candidate transcriptions From among the multiple candidate transcriptions, one or more candidate transcriptions are selected based on the classifier outputs (410). For example, the candidate transcription having the classifier output that indicates the highest likelihood of correctness may be selected. The multiple candidate transcriptions may be ranked based on the classifier outputs, and the highest-ranked candidate transcription may be selected. The selected candidate transcription may be provided to a client device or other system as a transcription for the utterance.

In some implementations, search results are received from search services for different domains, and scores may be determined for features of different domains. For example, for a music search domain, a score may indicate a degree that a top-ranked search result from a set of song titles matches the candidate transcription. For a web search domain, a score may indicate a degree that a top-ranked search result from among a set of web pages matches the candidate transcription. The scores for multiple domains may be provided in the same feature vector so the classifier can evaluate the candidate transcription based on different aspects of search results from different domains.

In some implementations, the score is a first feature score determined for a first set of content identified by the search service for a first domain. Data indicating second content that a search service for a second domain identifies as relevant to the candidate transcription is also received, and the second content is different from the first content. A second feature score for a second feature of the second content is received. The second feature may be different from the first feature. The first feature score and the second feature score are both provided to the classifier, for example, as part of a single feature vector. The classifier output that is received may be based on the first feature score and the second feature score.

Figure 5:
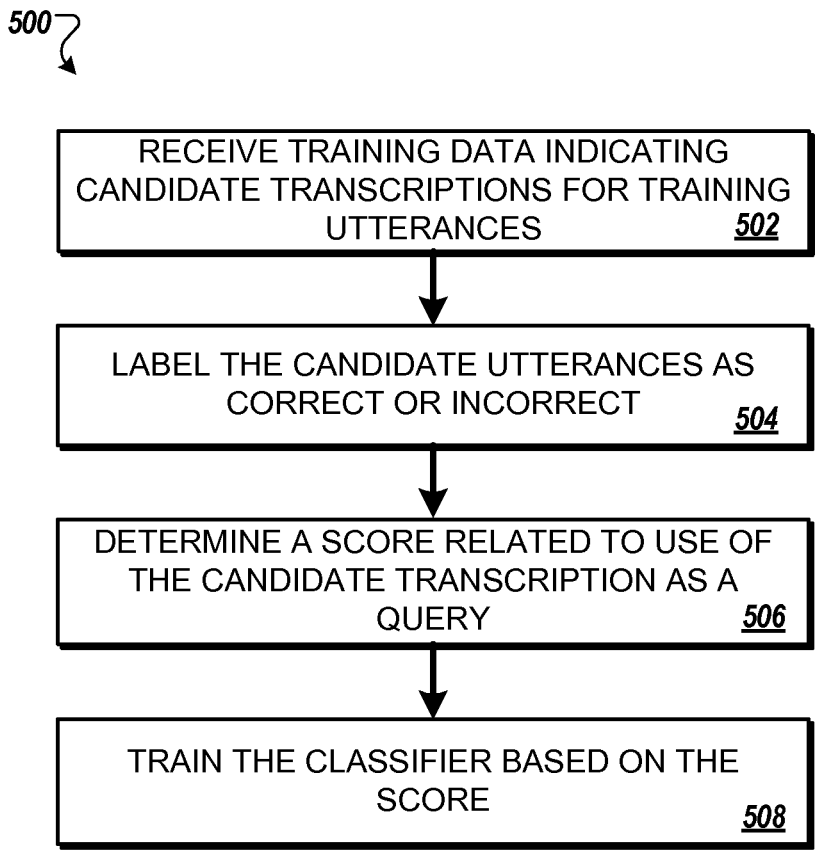
FIG. 5 is a flow diagram that illustrates an example of a process for training a classifier.

FIG. 5 is a flow diagram that illustrates an example of a process 500 for training a classifier. The operations of the process 500 may be performed by one or more computing systems, such as the computing system 120 of FIG. 1.

Training data is received (502). The training data can indicate a set of multiple candidate transcriptions for each of multiple training utterances. For example, the training data can indicate a predefined number of candidate transcriptions for each utterance, such as the n-best candidate transcriptions (e.g., top 3, 5, or 10 transcriptions) as indicated by a speech recognizer. The training data may also indicate, for each of the candidate transcriptions, a likelihood score output by the speech recognizer.

The candidate transcriptions are each labeled (504). For example, the correct transcription for each training utterance is labeled as being correct. The other candidate transcriptions for each utterance are labeled as incorrect. In this manner, the evaluating candidate transcriptions may be done within a binary classification framework, e.g., each candidate transcription is either correct or incorrect.

A score related to use of the candidate transcription as a query is determined (506). For example, the score can be indicative of a frequency that the candidate transcription has been submitted as a query. In some implementations, the score can be determined based on search results for the candidate transcription. A particular candidate transcription can be provided to a search service as a query, and search results for the particular candidate transcription may be received. The particular candidate transcription may be provided to search services for multiple different domains, and a set of search results may be received for each of the different domains.

In some implementations, the score may be a relevance score or other score that is generated by the search service. The score may indicate a degree that the content matches the candidate transcription. For example, the score may indicate a degree that a highest-ranked search result in a set of search results matches the candidate transcription. As another example, the score may indicate a degree that a second-highest-ranked search result in a set of search results matches the candidate transcription. For some domains, different features represent characteristics of different types or categories of search results in the domain. For example, one feature may represent a characteristic of search results that are artist names, another feature may represent a characteristic of search results that are song titles, and so on.

A classifier is trained using the score (508). For example, the classifier may be provided the label for the candidate transcription and a feature vector that includes the determined score. The feature vector may include scores for multiple features associated with a domain. In addition, the feature vector may include scores for multiple different domains, where the scores for each domain are determined based on a set of search results from that domain. The feature vector may include any of the scores discussed above, including, for example, scores for speech recognition features, semantic features, search result features, and query submission frequencies.

Training the classifier using information about multiple different domains can provide a unified framework that is more robust than, for example, a domain-specific classifier that takes into account characteristics of only a single domain. To train the classifier, weights or other parameters of the classifier may be adjusted to improve the classifier's ability to estimate the probability that a feature vector represents a correct transcription.

For each candidate transcription, multiple scores representing different characteristics may be determined and used to train the classifier. For example, one or multiple scores for semantic features, search result features, and/or speech recognition features may be determined and used to train the classifier. In addition, or as an alternative, one or more scores indicative of query submission frequencies may be determined and used to train the classifier. After training is complete, the same types of scores provided to the classifier during training may be input to the trained classifier to evaluate candidate transcriptions.

The classifier may be trained using any of various machine learning techniques. In some implementations, the classifier is a maximum entropy classifier. The operations of (506)-(508) may be repeated using scores for each of the different candidate transcriptions for each of the training utterances. As a result, the classifier may learn to indicate a likelihood that a candidate transcription is correct based on the scores it receives. The output of the trained classifier can indicate, for a given feature vector or other set of input data, a probability that the candidate transcription corresponding to the feature vector is correct.

In some implementations, the classifier uses conditional maximum entropy (ME) modeling. ME modeling may involve identifying a distribution that has the maximum entropy subject to known constraints expressed as features. Using a maximum entropy model allows arbitrary constraints to be used as features. This allows language modeling to capture short term dependency such as n-grams, long sentence dependency such as syntax, and semantics. The ME model may combine arbitrary context features from search results, syntax features from parsing, and speech features.

For the equations below, a feature, $f_i(c, h)$, can be a real-valued function of the candidate transcription or hypothesis h and a target class c. Maximum entropy allows the model distribution to be restricted to have the same expected value for this feature as its empirical value from training data, H. Thus, the learned conditional distribution P(c|h) must have the property:

$$\sum_{h \in H} f_i(c, h) = \sum_{h \in H} \sum_c P(c \mid h) f_i(c, h)$$

The maximum entropy distribution may be expressed as:

$$P(c \mid h) = \frac{e^{\sum_i \lambda_i * f_i(c,h)}}{Z(h)}$$

where Z(h) is a normalization factor:

$$Z(h) = \sum_c \sum_i \lambda_i * f_i(c, h).$$

In the above equations, the candidate transcription or hypothesis, h, can be a context that is represented by the feature vector for a particular candidate transcription. The feature functions, $f_i(c, h)$, which are typically binary, define constraints for the model. During ME training, optimal weights, $\lambda i$, corresponding to features $f_i(c, h)$ are learned so that the log-likelihood of the training data, H, is maximized. The weights, i, are learned via improved iterative scaling algorithm, or other algorithms such as a conjugate gradient descent algorithm or a limited-memory Broyden-Fletcher-Goldfarb-Shanno (L-BFGS) algorithm.

Embodiments of the invention and all of the functional operations described in this specification may be implemented in digital electronic circuitry, or in computer software, firmware, or hardware, including the structures disclosed in this specification and their structural equivalents, or in combinations of one or more of them. Embodiments of the invention may be implemented as one or more computer program products, i.e., one or more modules of computer program instructions encoded on a computer-readable storage device for execution by, or to control the operation of, data processing apparatus. The computer-readable storage device may be, for example, a machine-readable storage substrate, a memory device, a composition of matter producing a machine-readable propagated signal, or a combination of one or more of them. The computer-readable storage device may be a non-transitory machine-readable medium. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments of the invention may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments of the invention may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the invention, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Thus, particular embodiments of the invention have been described. Other embodiments are within the scope of the following claims. For example, the actions recited in the claims may be performed in a different order and still achieve desirable results.

What is claimed is:

1. A method of performing speech recognition that is performed by one or more computers of an automated speech recognizer, the method comprising:

receiving, by the one or more computers, data that indicates multiple candidate transcriptions for an utterance, wherein the one or more computers are in communication with (i) a first search system that provides a search service of a first domain, and (ii) a second search system that provides a search service for a second domain, the second domain being different from the first domain;

for each particular candidate transcription of the candidate transcriptions:

receiving, by the one or more computers, data from the first search system that provides the search service for the first domain, the data from the first search system indicating first search results that the search service for the first domain identifies as relevant to the particular candidate transcription;

determining, by the one or more computers, a first score based on the first search results that the search service for the first domain identifies as relevant to the particular candidate transcription;

receiving, by the one or more computers, data from the second search system that provides the search service for the second domain, the data from the second search system indicating second search results that the search service for the second domain identifies as relevant to the particular candidate transcription;

determining, by the one or more computers, a second score based on the second search results that the search service for the second domain identifies as relevant to the particular candidate transcription;

providing, by the one or more computers, (i) the first score that is determined based on the first search results and (ii) the second score that is determined based on the second search results as input to a classifier, wherein the classifier has been trained, using scores that represent characteristics of different search results from different domains, to indicate a likelihood that a transcription is correct based on scores for multiple different domains; and receiving, by the one or more computers and from the trained classifier, a classifier output in response to at least the first score and the second score, the classifier output indicating a likelihood that the particular candidate transcription is correct;

selecting, by the one or more computers, a transcription for the utterance, from among the multiple candidate transcriptions, based on the classifier outputs; and providing, by the one or more computers, the transcription as output of the automated speech recognizer.

2. The method of claim 1, further comprising, for each particular candidate transcription of the candidate transcriptions, receiving, by the one or more computers, data indicating a frequency that users have submitted the particular candidate transcription as a search query; and wherein providing, by the one or more computers, (i) the first score that is determined based on the first search results and (ii) the second score that is determined based on the second search results as input to the classifier comprises providing, by the one or more computers, the first score, the second score, and a third score that is indicative of the frequency that users have submitted the particular candidate transcription as a search query as input to the classifier.

3. The method of claim 1, wherein determining, by the one or more computers, the first score based on the content comprises determining, by the one or more computers, a score that indicates a degree that one or more of the first search results match the candidate transcription.

4. The method of claim 3, wherein determining, by the one or more computers, the score that indicates the degree that one or more of the first search results match the candidate transcription comprises determining, by the one or more computers, a score indicating a degree that a highest-ranked search result of the first search results matches the candidate transcription.

5. The method of claim 3, wherein determining, by the one or more computers, the score that indicates the degree that one or more of the first search results match the candidate transcription comprises determining, by the one or more computers, a score indicating a degree that a second-ranked search result of the first search results matches the candidate transcription.

6. The method of claim 1, wherein determining, by the one or more computers, the first score based on the first search results comprises accessing, by the one or more computers, a score that is generated by the search service for the first domain.

7. The method of claim 1, further comprising, for each particular candidate transcription of the multiple candidate transcriptions, providing, by the one or more computers, the particular candidate transcription to the search service for the first domain as a query;
wherein receiving, by the one or more computers, the data indicating the first search results that the search service for the first domain identifies as relevant to the particular candidate transcription comprises receiving, by the one or more computers, the data indicating the first search results in response to providing the particular candidate transcription to the search service for the first domain as a query.

8. The method of claim 1, wherein selecting, by the one or more computers, the transcription utterance, from among the multiple candidate transcriptions comprises:
ranking, by the one or more computers, the multiple candidate transcriptions based on the classifier outputs; and
selecting, by the one or more computers, the highest-ranked candidate transcription.

9. The method of claim 1, wherein providing, by the one or more computers, (i) the first score determined based on the first search results and (ii) the second score determined based on the second search results as input to the classifier comprises:
providing, by the one or more computers, the first score and the second score as input to a trained maximum entropy classifier.

10. The method of claim 1, wherein the trained classifier has been trained using (i) a first set of scores corresponding to first features relevant to the first domain and (ii) a second set of feature scores for second features relevant to the second domain, wherein at least some of the second features are different from the first features.

11. An automated speech recognizer system comprising:
one or more computers in communication with (i) a first search system that provides a search service for a first domain, and (ii) a second search system that provides a search service for a second domain, the second domain being different from the first domain; and
one or more storage devices storing instructions that are operable, when executed by the one or more computers, to cause the one or more computers to perform operations comprising:
receiving, by the one or more computers, data that indicates multiple candidate transcriptions for an utterance;
for each particular candidate transcription of the candidate transcriptions:
providing, by the one or more computers, first query data to the first search system, wherein the first query data specifies the particular candidate transcription as a query to the search service for the first domain;
receiving, by the one or more computers, data from the first search system indicating first search results that the search service for the first domain identifies as relevant to the particular candidate transcription;
determining, by the one or more computers, a first score based on the first search results that the search service for the first domain identifies as relevant to the particular candidate transcription;
providing, by the one or more computers, second query data to the second search system, wherein the second query data specifies the particular candidate transcription as a query to the search service for the second domain;
receiving, by the one or more computers, data from the second search system indicating second search results that the search service for the second domain identifies as relevant to the particular candidate transcription;
determining, by the one or more computers, a second score based on the second search results that the search service for the second domain identifies as relevant to the particular candidate transcription;
providing, by the one or more computers, (i) the first score that is determined based on the first search results and (ii) the second score that is determined based on the second search results as input to a classifier, wherein the classifier has been trained, using scores that represent characteristics of different search results from different domains, to indicate a likelihood that a transcription is correct based on scores for multiple different domains; and
receiving, by the one or more computers and from the trained classifier, a classifier output in response to at least the first score and the second score, the classifier output indicating a likelihood that the particular candidate transcription is correct;
selecting, by the one or more computers, a transcription for the utterance, from among the multiple candidate transcriptions, based on the classifier outputs; and
providing, by the one or more computers, the transcription as output of the automated speech recognizer system.

12. A non-transitory computer-readable storage device encoded with a computer program, the program comprising instructions that, when executed by one or more computers of an automated speech recognizer, cause the one or more computers to perform operations comprising:
receiving, by the one or more computers, data that indicates multiple candidate transcriptions for an utterance, wherein the one or more computers are in communication with (i) a first search system that provides a search service of a first domain, and (ii) a second search system that provides a search service for a second domain, the second domain being different from the first domain;

for each particular candidate transcription of the candidate transcriptions:
provided, by the one or more computers, first query data to the search service for the first domain, wherein the first query data specifies the particular candidate transcription as a query to the search service for the first domain;
receiving, by the one or more computers, data from the first search system that provides the search service for the first domain, the data from the first search system indicating first search results that the search service for the first domain identifies as relevant to the particular candidate transcription;
determining, by the one or more computers, a first score based on the first search results that the search service for the first domain identifies as relevant to the particular candidate transcription;
providing, by the one or more computers, second query data to the search service for the second domain, wherein the second query data specifies the particular candidate transcription as a query to the search service for the second domain;
receiving, by the one or more computers, data from the second search system that provides the search service for the second domain, the data from the second search system indicating second search results that the search service for the second domain identifies as relevant to the particular candidate transcription;
determining, by the one or more computers, a second score based on the second search results that the search service for the second domain identifies as relevant to the particular candidate transcription;
providing, by the one or more computers, (i) the first score that is determined based on the first search results and (ii) the second score that is determined based on the second search results as input to a classifier, wherein the classifier has been trained, using scores that represent characteristics of different search results from different domains, to indicate a likelihood that a transcription is correct based on scores for multiple different domains; and
receiving, by the one or more computers and from the trained classifier, a classifier output in response to at least the first score and the second score, the classifier output indicating a likelihood that the particular candidate transcription is correct;
selecting, by the one or more computers, a transcription for the utterance, from among the multiple candidate transcriptions, based on the classifier outputs; and
providing, by the one or more computers, the transcription as output of the automated speech recognizer.

13. The method of claim 1, wherein receiving, by the one or more computers, the data indicating the first search results that the search service for the first domain identifies as relevant to the particular candidate transcription comprises:
receiving, by the one or more computers, data indicating search results that the search service for the first domain identifies in a first data collection; and
wherein receiving, by the one or more computers, the data indicating the second search results that the search service for the second domain identifies as relevant to the particular candidate transcription comprises:
receiving, by the one or more computers, data indicating search results that the search service for the second domain identifies in a second data collection that is different from the first data collection.

14. The method of claim 1, wherein receiving, by the one or more computers, the data indicating the first search results that the search service for the first domain identifies as relevant to the particular candidate transcription comprises:
receiving, by the one or more computers, data indicating first search results that the search service for the first domain identifies in a first data collection, wherein the first data collection is selected from a group consisting of (i) data associated with web documents, (ii) data associated with a set of media items, (iii) data associated with a set of applications, and (iv) data associated with a set of voice commands; and
wherein receiving, by the one or more computers, the data indicating the second search results that the search service for the second domain identifies as relevant to the particular candidate transcription comprises:
receiving, by the one or more computers, data indicating search results that the search service for the second domain identifies in a second data collection, wherein the second data collection is different from the first data collection and is selected from the group consisting of (i) data associated with web documents, (ii) data associated with a set of media items, (iii) data associated with a set of applications, and (iv) data associated with a set of voice commands.

15. The method of claim 1, wherein receiving, by the one or more computers, the data indicating the first search results that the search service for the first domain identifies as relevant to the particular candidate transcription comprises:
receiving, by the one or more computers, data indicating search results from a search service that provides a first type of information; and
wherein receiving, by the one or more computers, the data indicating the second search results that the search service for the second domain identifies as relevant to the particular candidate transcription comprises:
receiving, by the one or more computers, data indicating search results from a search service that provides a type of information different from the first type of information.

16. The method of claim 1, further comprising, for each particular candidate transcription of the candidate transcriptions:
determining, by the one or more computers, whether the particular candidate transcription matches at least one of a set of one or more predetermined semantic patterns; and
determining, by the one or more computers, a third score that indicates whether the particular candidate transcription matches at least one of a set of one or more predetermined semantic patterns;
wherein providing, by the one or more computers, the first score and the second score as input to the classifier comprises providing, by the one or more computers, the first score, the second score, and the third score that indicates whether the particular candidate transcription matches at least one of a set of one or more predetermined semantic patterns as input to the classifier.

17. The method of claim 1, wherein the search results in the first set of search results are ranked; and
wherein determining, by the one or more computers, the first score based on the first search results that the search service for the first domain identifies as relevant to the particular candidate transcription comprises:

determining, by the one or more computers, as the first score, a score that is indicative of one or more characteristics of the search result that occurs at a particular predetermined position in the ranking of the first search results.

18. A method of performing speech recognition that is performed by data processing apparatus of an automated speech recognizer, the method comprising:
receiving, by the data processing apparatus, data that indicates multiple candidate transcriptions for an utterance, wherein the data processing apparatus is in communication with (i) a first search system that provides a search service of a first domain, and (ii) a second search system that provides a search service for a second domain, the second domain being different from the first domain;
for each particular candidate transcription of the candidate transcriptions:
receiving, by the data processing apparatus, data from the first search system that provides the search service for the first domain, the data from the first search system indicating first search results that the search service for the first domain identifies as relevant to the particular candidate transcription;
determining, by the data processing apparatus, a first score based on the first search results that the search service for the first domain identifies as relevant to the particular candidate transcription, wherein the search results in the first set of search results are ranked, wherein determining the first score based on the first search results that the search service for the first domain identifies as relevant to the particular candidate transcription comprises:
determining, by the data processing apparatus and as the first score, a score that is indicative of one or more characteristics of the search result that occurs at a particular predetermined position in the ranking of the first search results;
receiving, by the data processing apparatus, data from the second search system that provides the search service for the second domain, the data from the second search system indicating second search results that the search service for the second domain identifies as relevant to the particular candidate transcription;
determining, by the data processing apparatus, a second score based on the second search results that the search service for the second domain identifies as relevant to the particular candidate transcription;
providing, by the data processing apparatus and to a trained classifier, (i) the first score that is determined based on the first search results and (ii) the second score that is determined based on the second search results; and
receiving, by the data processing apparatus and from the trained classifier, a classifier output in response to at least the first score and the second score, the classifier output indicating a likelihood that the candidate transcription is a correct transcription;
selecting, by the data processing apparatus, from among the multiple candidate transcriptions based on the classifier outputs; and
providing, by the data processing apparatus, the transcription as output of the automated speech recognizer.

19. The method of claim 1, further comprising, for each particular candidate transcription:
determining, by the one or more computers, a plurality of feature scores that each indicate a degree of match between the particular candidate transcription and a different grammar;
wherein providing, by the one or more computers, the scores as input to the classifier comprises providing, by the one or more computers, the first score, the second score, and the plurality of feature scores to the classifier, the classifier having been trained using scores indicating characteristics of search results and scores indicating degrees of matches between transcriptions and the different grammars; and
wherein receiving, by the one or more computers, the classifier output comprises receiving a classifier output determined based on the first score, the second score, the first domain-specific query submission score, and the second domain-specific query submission score.

20. The method of claim 1, further comprising, for each particular candidate transcription:
determining, by the one or more computers, a first domain-specific query submission score that indicates a frequency that the particular candidate transcription was submitted as a query directed to the first domain; and
determining, by the one or more computers, a second domain-specific query submission score that indicates a frequency that the particular candidate transcription was submitted as a query directed to the second domain;
wherein providing, by the one or more computers, the scores as input to the classifier comprises providing, by the one or more computers, the first score, the second score, the first domain-specific query submission score, and the second domain-specific query submission score to the classifier, the classifier having been trained using examples of scores indicating characteristics of search results for multiple domains and using scores indicating domain-specific query submission scores for multiple domains; and
wherein receiving, by the one or more computers, the classifier output comprises receiving, by the one or more computers, a classifier output determined based on the first score, the second score, the first domain-specific query submission score, and the second domain-specific query submission score.

21. The method of claim 1, further comprising, for each particular candidate transcription:
determining, by the one or more computers, a first plurality of scores that includes the first score, each of the first plurality of scores being determined based on the first search results that the search service for the first domain identifies as relevant to the particular candidate transcription, wherein the first plurality of scores includes at least (ii) an aggregate measure that is determined based on multiple search results of the first search results, and (i) an individual measure that is determined based on only the characteristics of a single search result in the first search results;
determining, by the one or more computers, a second plurality of scores that includes the second score, each of the second plurality of scores being determined based on the second search results that the search service for the second domain identifies as relevant to the particular candidate transcription, wherein the second plurality of scores includes at least (ii) an aggregate measure that is determined based on multiple search results of the second search results, and (i) an individual measure that is determined based on only the characteristics of a single search result in the second search results;

wherein providing, by the one or more computers, the scores as input to the classifier comprises providing, by the one or more computers, the first plurality of scores and the second plurality of scores to the trained classifier, wherein at least one of the second plurality of scores indicates a search result characteristic that is not indicated by the first plurality of scores; and wherein receiving, by the one or more computers, the classifier output comprises receiving, by the one or more computers, a classifier output determined based on the first plurality of scores and the second plurality of scores.

* * * * *